US010313671B2

(12) United States Patent
Oh et al.

(10) Patent No.: US 10,313,671 B2
(45) Date of Patent: Jun. 4, 2019

(54) METHOD FOR GENERATING INTRA PREDICTION BLOCK WITH MOST PROBABLE MODE

(71) Applicant: INFOBRIDGE PTE. LTD., Singapore (SG)

(72) Inventors: Soo Mi Oh, Seongnam (KR); Moonock Yang, Singapore (SG)

(73) Assignee: INFOBRIDGE PTE. LTD., Singapore (SG)

(*) Notice: Subject to any disclaimer, the term of this patent is extended or adjusted under 35 U.S.C. 154(b) by 0 days.

(21) Appl. No.: 15/879,994

(22) Filed: Jan. 25, 2018

(65) Prior Publication Data

US 2018/0152706 A1 May 31, 2018

Related U.S. Application Data

(63) Continuation of application No. 14/852,197, filed on Sep. 11, 2015, now Pat. No. 9,912,950, which is a
(Continued)

(30) Foreign Application Priority Data

Nov. 4, 2011 (KR) .................. 10-2011-0114607

(51) Int. Cl.
*H04N 7/12* (2006.01)
*H04N 19/126* (2014.01)
(Continued)

(52) U.S. Cl.
CPC ........... *H04N 19/126* (2014.11); *H04N 19/11* (2014.11); *H04N 19/124* (2014.11);
(Continued)

(58) Field of Classification Search
CPC ............................ H04N 19/176; H04N 19/70
(Continued)

(56) References Cited

U.S. PATENT DOCUMENTS 6,483,947 B1   11/2002   Yasue et al.
2002/0054638 A1   5/2002   Hanamura et al.
(Continued)

FOREIGN PATENT DOCUMENTS

CN   1233134 A   10/1999
CN   1339922 A   3/2002
(Continued)

OTHER PUBLICATIONS

Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F803_d6, pp. 1-217 (229 pages total).
(Continued)

*Primary Examiner* — Richard T Torrente
(74) *Attorney, Agent, or Firm* — Birch, Stewart, Kolasch & Birch, LLP

(57) ABSTRACT

A method for generating a prediction block in intra prediction can include restoring a mode group indicator and a prediction mode index; constructing a most probable mode (MPM) group including three intra prediction modes of a current block; determining an intra prediction mode specified by the intra prediction mode index in the MPM group as the intra prediction mode of the current block if the mode group indicator indicates the MPM group, and deriving the intra prediction mode of the current block using the prediction mode index and the three intra prediction modes of the MPM group if the mode group indicator does not indicate the MPM group; determining a size of the prediction block
(Continued)

based on transform size information; determining whether all reference pixels of the current block are available; generating reference pixels if one or more reference pixels of the current block are unavailable; adaptively filtering the reference pixels based on the intra prediction mode and the size of the current block; and generating the prediction block using the reference pixels based on the restored intra prediction mode.

7 Claims, 9 Drawing Sheets

Related U.S. Application Data continuation of application No. 14/592,809, filed on Jan. 8, 2015, now Pat. No. 9,204,151, which is a continuation of application No. 14/353,891, filed as application No. PCT/CN2012/083978 on Nov. 2, 2012, now Pat. No. 9,264,723.

(51) Int. Cl.

| | | |
|---|---|---|
| *H04N 19/176* | (2014.01) | |
| *H04N 19/70* | (2014.01) | |
| *H04N 19/61* | (2014.01) | |
| *H04N 19/463* | (2014.01) | |
| *H04N 19/124* | (2014.01) | |
| *H04N 19/136* | (2014.01) | |
| *H04N 19/593* | (2014.01) | |
| *H04N 19/11* | (2014.01) | |
| *H04N 19/157* | (2014.01) | |
| *H04N 19/105* | (2014.01) | |

(52) U.S. Cl.
CPC ......... *H04N 19/136* (2014.11); *H04N 19/157* (2014.11); *H04N 19/176* (2014.11); *H04N 19/463* (2014.11); *H04N 19/593* (2014.11); *H04N 19/61* (2014.11); *H04N 19/70* (2014.11); *H04N 19/105* (2014.11)

(58) Field of Classification Search
USPC .................................................. 375/240.03
See application file for complete search history.

(56) References Cited

U.S. PATENT DOCUMENTS

| | | |
|---|---|---|
| 2004/0223657 A1 | 11/2004 | Sugimoto et al. |
| 2007/0071094 A1 | 3/2007 | Takeda et al. |
| 2008/0181522 A1 | 7/2008 | Hosaka et al. |
| 2011/0176605 A1 | 7/2011 | Kim et al. |
| 2011/0267502 A1 | 11/2011 | Tang |
| 2011/0274162 A1 | 11/2011 | Zhou et al. |
| 2011/0292994 A1* | 12/2011 | Lim ............... H04N 19/182 375/240.02 |
| 2012/0230403 A1 | 9/2012 | Liu et al. |
| 2012/0251015 A1 | 10/2012 | Lim et al. |
| 2012/0307905 A1 | 12/2012 | Kim et al. |
| 2012/0314766 A1 | 12/2012 | Chien et al. |
| 2012/0320971 A1 | 12/2012 | Xu |
| 2012/0327999 A1* | 12/2012 | Francois ........... H04N 19/13 375/240.02 |
| 2013/0016773 A1 | 1/2013 | Oh |
| 2013/0077871 A1 | 3/2013 | Lu et al. |
| 2013/0266064 A1 | 10/2013 | Zhang et al. |
| 2013/0330012 A1 | 12/2013 | Sato |
| 2014/0079117 A1 | 3/2014 | Yang et al. |
| 2015/0381985 A1 | 12/2015 | Oh et al. |

FOREIGN PATENT DOCUMENTS

| | | |
|---|---|---|
| CN | 102658478 A | 9/2002 |
| CN | 101888550 A | 11/2010 |
| CN | 102685483 A | 9/2012 |
| CN | 102685484 A | 9/2012 |
| CN | 102685485 A | 9/2012 |
| JP | 2010-263390 A | 11/2015 |
| JP | 5841264 B2 | 1/2016 |
| KR | 10-2008-0071940 A | 8/2008 |
| WO | WO 2009/105732 A1 | 8/2009 |
| WO | WO 2011/052215 A1 | 5/2011 |
| WO | WO 2011/062392 A2 | 5/2011 |
| WO | WO 2012/018198 A2 | 2/2012 |
| WO | WO 2012/122798 A1 | 9/2012 |
| WO | WO 2012/124461 A1 | 9/2012 |
| WO | WO 2013/037489 A1 | 3/2013 |
| WO | WO 2013/039676 A1 | 3/2013 |
| WO | WO 2013/051903 A1 | 4/2013 |

OTHER PUBLICATIONS

Sato, "CE4: Result of Combination 2.3.g + 2.3.e," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F648, pp. 1-4.

Zhang et al., "Method for deriving Chroma QP from Luma QP," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F277, pp. 1-6.

Bross et al., "High Efficiency Video Coding (HEVC) Text Specification Draft 6," Joint Collaborative Team on Video Coding (JCT-VC) of ITU-T SG16 WP3 and ISO/IEC JTC1/SC29/WG11, 7th Meeting, Geneva, Switzerland, Nov. 21-30, 2011, JCTVC-H1003, 14 pages.

Guo et al., "Non-Square Transform for 2NxN and Nx2N Motion Partitions," Joint Collaborative Team on Video Coding (JCT-VC) of ITU-T SG16 WP3 and ISO/IEC JTC1/SC29/WG11, 6th Meeting, Torino, Jul. 14-22, 2011 (downloaded on Jul. 2, 2011), JCTVC-F563, XP030009586, 4 pages.

International Search Report for PCT/CN2012/083978 filed on Nov. 2, 2012.

Kondo et al., "Improvement of Delta-QP Coding," Joint Collaborative Team on Video Coding (JCT-VC) of ITU-T SG16 WP3 and ISO/IEC JTC1/SC29/WG11, 6th Meeting, Torino, Italy, Jul. 14-22, 2011 (downloaded on Jul. 1, 2011), JCTVC-F422, XP030009445, 6 pages.

Nakamura et al., "Non-CE4: Compatible QP Prediction with RC and AQ," Joint Collaborative Team on Video Coding (JCT-VC) of ITU-T SG16 WP3 and ISO/IEC JTC1/SC29/WG11, Document: JCTVC-H0204, 8th Meeting: San Jose, USA, Feb. 1-10, 2012, pp. 1-12.

Pang et al., "Sub-LCU QP Representation," Joint Collaborative Team on Video Coding (JCT-VC) of ITU-T SG16 WP3 and ISO/IEC JTC1/SC29/WG11, 5th Meeting, Geneva, Switzerland, Mar. 16-23, 2011, JCTVC-E436, XP030048550, 6 pages.

Sato, "CE4: Result of 2.3.d and 2.3.e," Joint Collaborative Team on Video Coding (JCT-VC) of ITU-T SG16 WP3 and ISO/IEC JTC1/SC29/WG11, Document: JCTVC-F420rl, 6th Meeting: Torino, Italy, Jul. 14-22, 2011, pp. 1-5.

Tanaka et al., "Quantization Matrix for HEVC," Joint Collaborative Team on Video Coding (JCT-VC) of ITU-T SG16 WP3 and ISO/IEC JTC1/SC29/WG11, 5th Meeting, Geneva, Switzerland, Mar. 16-23, 2011, JCTVC-E073, 24 pages.

Zhou et al., "Compact Representation of Quantization Matrices for HEVC," Joint Collaborative Team on Video Coding (JCT-VC) of ITU-T SG16 WP3 and ISO/IEC JTC1/SC29/WG11, 4th Meeting, Daegu, Korea, Jan. 20-28, 2011, JCTVC-D024, 9 pages.

Cheung Auyeung, et al., "Intra Coding with Directional DCT and Directional DWT", Joint Collaborative Team on Video Coding (JCT-VC) of ITU-T SG16 WP3 and ISO/IEC JTC1/SC29/WG11, 2nd Meeting, Geneva, CH, Jul. 21-28, 2010, JCTVC-B107, 28 pages.

(56) References Cited

OTHER PUBLICATIONS

Chono et al., "Efficient Binary Representation of cu_qp_delta Syntax for CABAC," Joint Collaborative Team on Video Coding (JCT-VC) of ITU-T SG16 WP3 and ISO/IEC JTC1/SC29/WG11, Document: JCTVC-F046-rl, MPEG No. m20458, 6th Meeting, Torino, Italy, Jul. 14-22, 2011, pp. 1-10.

Fujibayashi et al., "CE9 3.2d Simplified Motion vector prediction," Joint Collaborative Team on Video Coding (JCT-VC) of ITU-T SG16 WP3 and ISO/IEC JTC1/SC29/WG11, JCTVC-D231, 4th Meeting: Daegu, Korea, Jan. 20-28, 2011 (date saved: Jan. 15, 2011), XP030008271, pp. 1-5.

Kobayashi et al., "Sub-LCU Level Delta QP Signaling," Joint Collaborative Team on Video Coding (JCT-VC) of ITU-T SG16 WP3 and ISO/IEC JTC1/SC29/WG11, Document: JCTVC-E198, 5th Meeting: Genève CH, Mar. 16-23, 2011, pp. 1-9.

Kondo et al., "Improvement of delta-QP Coding," Joint Collaborative Team on Video Coding (JCT-VC) of ITU-T SG16 WP3 and ISO/IEC JTC1/SC29/WG11, 6th Meeting, JCTVC-F422r1, Torino, IT, Jul. 14-22, 2011, pp. 1-8.

Nakamura et al., "Non-CE4: Compatible QP prediction with RC and AQ," Joint Collaborative Team on Video Coding (JCT-VC) of ITU-T SG16 WP3 and ISO/IEC JTC1/SC29/WG11, Document: JCTVC-H0204, 8th Meeting, San José, CA, USA, Feb. 1-10, 2012, pp. 1-15.

Tan et al., "CE9: Skip/Merge Simplification with Reduced Candidate Set (Test L)," Joint Collaborative Team on Video Coding (JCT-VC) of ITU-T SG16 WP3 and ISO/IEC JTC1/SC29/WG11, JCTVC-E102, 5th Meeting: Geneva, CH, Mar. 16-23, 2011 (date saved: Mar. 10, 2011), XP030008608, pp. 1-4.

Zhang et al., "Low Complexity Algorithm for Spatially Varying Transforms," Picture Coding Symposium 2009, May 6, 2009, XP030081788, 4 pages.

\* cited by examiner

METHOD FOR GENERATING INTRA PREDICTION BLOCK WITH MOST PROBABLE MODE

CROSS-REFERENCE TO RELATED APPLICATIONS

This application is a continuation of U.S. application Ser. No. 14/852,197 filed on Sep. 11, 2015, which is a continuation of U.S. application Ser. No. 14/592,809 filed on Jan. 8, 2015 (now U.S. Pat. No. 9,204,151 issued on Dec. 1, 2015), which is a continuation of U.S. application Ser. No. 14/353,891 filed on Apr. 24, 2014 (now U.S. Pat. No. 9,264,723 issued on Feb. 16, 2016), which was filed as the National Stage of PCT Application No. PCT/CN2012/083978 filed on Nov. 2, 2012, which claims priority of Korean Application No. 10-2011-0114607 filed on Nov. 4, 2011, all of which are hereby expressly incorporated by reference into the present application.

BACKGROUND OF THE INVENTION

Technical Field

The present invention relates to a method and an apparatus of deriving a quantization parameter, and more particularly, to a method and apparatus of encoding and decoding a quantization parameter by generating a quantization parameter predictor similar to the quantization parameter using neighboring quantization parameter.

Background Art

In H.264/MPEG-4 AVC, one picture is divided into macroblocks, the respective macroblocks are encoded by generating a prediction block using inter prediction or intra prediction. The difference between an original block and the prediction block is transformed to generate a transformed block, and the transformed block is quantized using a quantization parameter and quantization matrix. The quantization parameter is adjusted per macroblock and is encoded using a previous quantization parameter as a quantization parameter predictor.

Meanwhile, in HEVC (High Efficiency Video Coding) under construction, various sizes of coding unit are introduced to obtain two times of compression efficiency. The coding unit has a role similar to the macroblock of H.264.

But, if the quantization parameter is adjusted per coding unit, the number of quantization parameters to be encoded increases as the size of the coding unit is smaller. Therefore, adjusting quantization parameter per coding unit results in greater quantity of coding bits required to encode the quantization parameter, which degrades the coding efficiency. Also, because using various sizes of coding unit makes the correlation between the quantization parameter and the previous quantization parameter weaker than that of H.264, a new method of encoding and decoding the quantization parameter is required for various sizes of the coding unit.

SUMMARY OF THE INVENTION

The present invention is directed to a method of restoring a differential quantization parameter of a current coding unit, generating a quantization parameter predictor of the current coding unit, and generating a quantization parameter of the current coding unit using the differential quantization parameter and the quantization parameter predictor.

One aspect of the present invention provides a method of decoding quantization parameter a current coding unit, comprising: restoring a differential quantization parameter of a current coding unit, generating a quantization parameter predictor of the current coding unit, and generating a quantization parameter of the current coding unit using the differential quantization parameter and the quantization parameter predictor, wherein the quantization parameter predictor is generated using one or two quantization parameters of a left quantization parameter, an above quantization parameter and a previous quantization parameter.

A method according to an embodiment of the present invention restores a differential quantization parameter of a current coding unit, generates a quantization parameter predictor of the current coding unit using one or two quantization parameters of a left quantization parameter, an above quantization parameter and a previous quantization parameter, and generates a quantization parameter of the current coding unit using the differential quantization parameter and the quantization parameter predictor, wherein a minimum size of quantization unit is adjusted per picture. Therefore, the complexity of the encoding and decoding apparatus is reduced by adjusting the minimum size of the quantization unit. Also, coding efficiency is improved by encoding the quantization parameter using plurality quantization parameters and by signaling the minimum size of the quantization unit per picture.

DETAILED DESCRIPTION OF THE EMBODIMENTS

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

Figure 1:
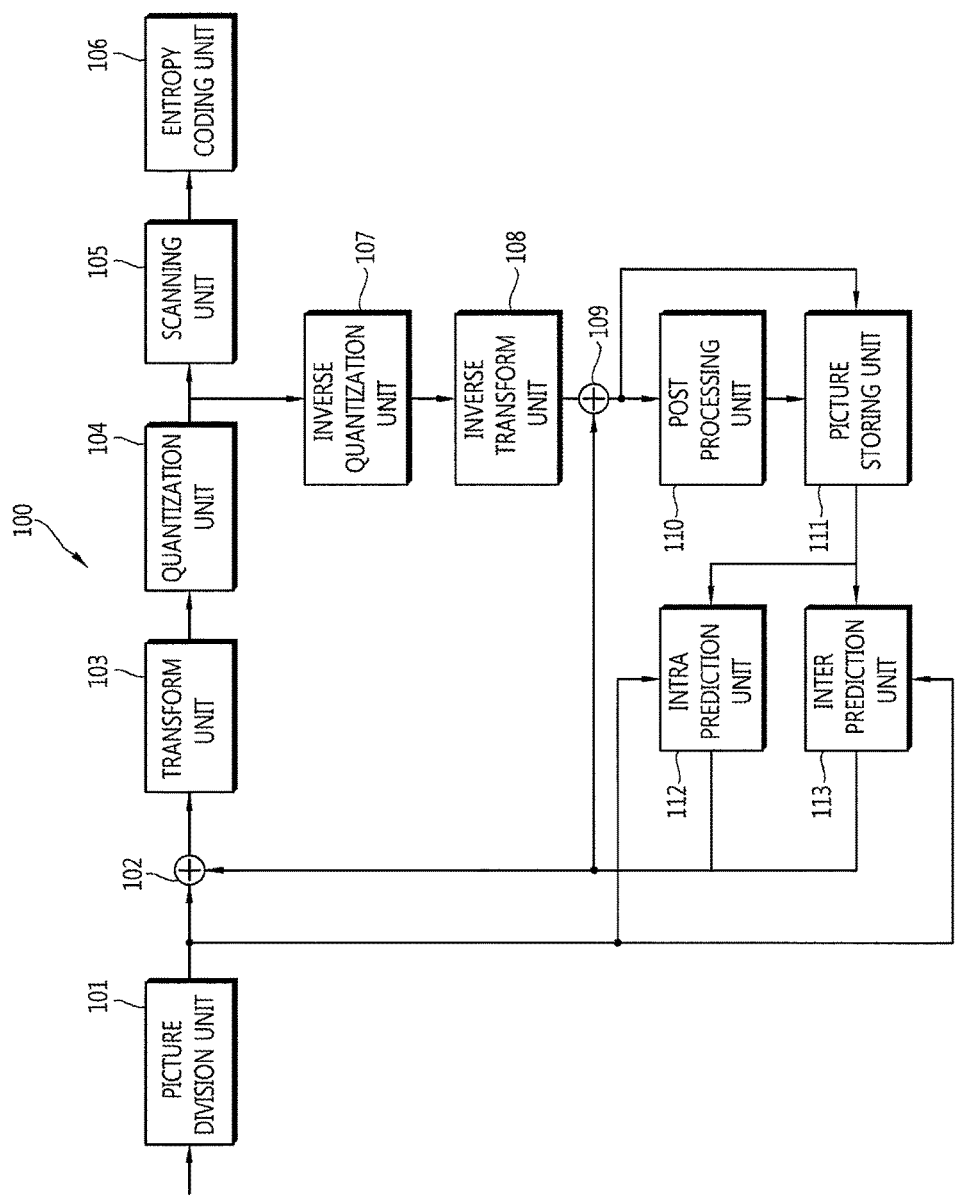
FIG. 1 is a block diagram of an image coding apparatus according to an embodiment of the present invention.

FIG. 1 is a block diagram of an image coding apparatus 100 according to the present invention.

Referring to FIG. 1, the image coding apparatus 100 according to the present invention includes a picture division unit 101, a transform unit 103, a quantization unit 104, a scanning unit 105, an entropy coding unit 106, an inverse quantization unit 107, an inverse transform unit 108, a post-processing unit 110, a picture storing unit 111, an intra prediction unit 112, an inter prediction unit 113, a subtracter 102 and an adder 109.

The picture division unit 101 divides a picture or a slice into a plurality of largest coding units (LCUs), and divides each LCU into one or more coding units. The picture division unit 101 determines prediction mode of each coding unit and a size of prediction unit and a size of transform unit.

An LCU includes one or more coding units. The LCU has a recursive quad tree structure to specify a division structure. Information specifying the maximum size and the minimum size of the coding unit is included in a sequence parameter set. The division structure is specified by one or more split coding unit flags (split_cu_flags). The coding unit has a size of 2N×2N.

A coding unit includes one or more prediction units. In intra prediction, the size of the prediction unit is 2N×2N or N×N. In inter prediction, the size of the prediction unit is 2N×2N, 2N×N, N×2N or N×N. When the prediction unit is an asymmetric partition in inter prediction, the size of the prediction unit may also be one of hN×2N, (2−h)N×2N, 2N×hN and 2N×(2−h)N. The value of h is ½.

A coding unit includes one or more transform units. The transform unit has a recursive quad tree structure to specify a division structure. The division structure is specified by one or more split transform unit flags (split_tu_flags). Information specifying the maximum size and the minimum size of the transform unit is included in a sequence parameter set.

The intra prediction unit 112 determines an intra prediction mode of a current prediction unit and generates one or more prediction blocks using the intra prediction mode. The prediction block has the same size of the transform unit. The intra prediction unit 112 generates reference pixels if there are unavailable reference pixels of a current block, filters adaptively the reference pixels of the current block according to the size of the current block and the intra prediction mode, and generates a prediction block of the current block. The current block has the same size of the prediction block.

Figure 2:
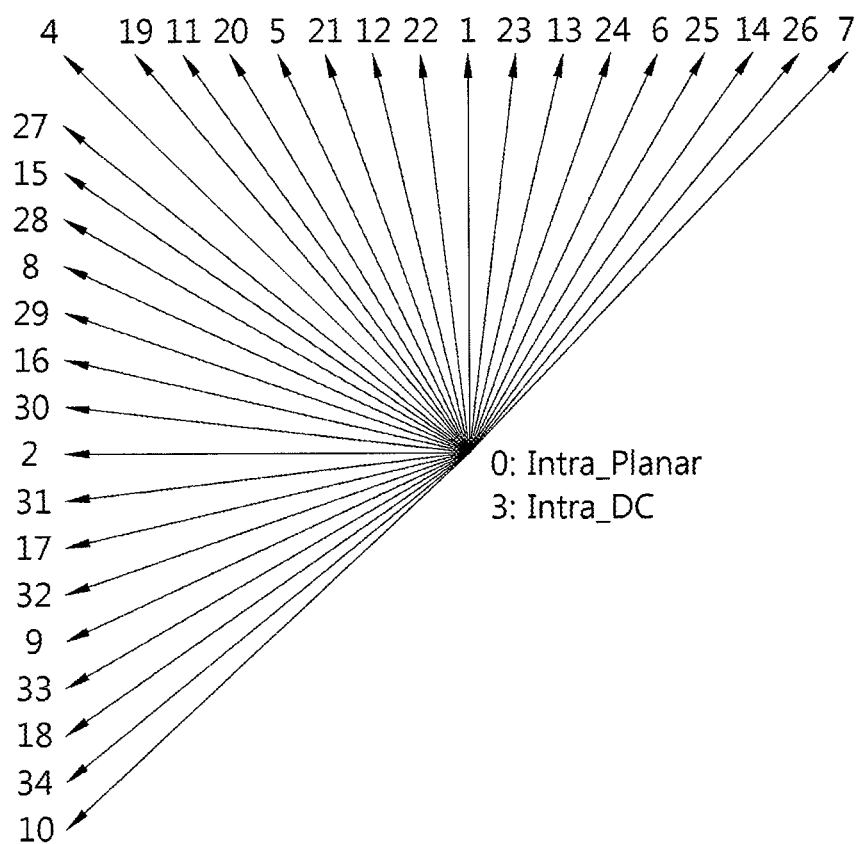
FIG. 2 is a conceptual diagram illustrating intra prediction modes according to an embodiment of the present invention.

FIG. 2 is a conceptual diagram illustrating intra prediction modes according to the present invention. As shown in FIG. 2, the number of intra prediction modes is 35. The DC mode and the planar mode are non-directional intra prediction modes and the others are directional intra prediction modes.

The inter prediction unit 113 determines motion information of the current prediction unit using one or more reference pictures stored in the picture storing unit 111, and generates a prediction block of the prediction unit. The motion information includes one or more reference picture indexes and one or more motion vectors.

The transform unit 103 transforms residual signals generated using an original block and a prediction block to generate a transformed block. The residual signals are transformed in transform units. A transform type is determined by the prediction mode and the size of the transform unit. The transform type is a DCT-based integer transform or a DST-based integer transform.

The quantization unit 104 determines a quantization parameter for quantizing the transformed block. The quantization parameter is a quantization step size. The quantization parameter is determined per quantization unit having a size of coding unit equal to or larger than a reference size. The reference size is a minimum size of the quantization unit. If a size of the coding unit is equal to or larger than the minimum size of the quantization unit, the coding unit becomes the quantization unit. A plurality of coding units may be included in the minimum quantization unit. The minimum size of the quantization unit is one of allowable sizes of the coding unit.

The quantization unit 104 generates a quantization parameter predictor and generates a differential quantization parameter by subtracting the quantization parameter predictor from the quantization parameter. The differential quantization parameter is encoded and transmitted to the decoder. If there are no residual signals to be transmitted within the coding unit, the differential quantization parameter of the coding unit may not be transmitted.

The quantization parameter predictor is generated by using quantization parameters of neighboring coding units and/or a quantization parameter of previous coding unit.

In one example, the quantization unit 104 sequentially retrieves a left quantization parameter, an above quantization parameter and an above left quantization parameter in this order, and generates the quantization parameter predictor using one or two available quantization parameters. For example, an average of the first two available quantization parameters retrieved in that order is set as the quantization parameter predictor when at least two quantization parameters are available. When only one quantization parameter is available, the available quantization parameter is set as the quantization parameter predictor. The left quantization parameter is a quantization parameter of a left neighboring coding unit. The above quantization parameter is a quantization parameter of an above neighboring coding unit. The above left quantization parameter is a quantization parameter of an above left neighboring coding unit.

In another example, the quantization unit 104 sequentially retrieves a left quantization parameter, an above quantization parameter and a previous quantization parameter in this order, and generates the quantization parameter predictor using one or two available quantization parameters. An average of the first two available quantization parameters retrieved in that order is set as the quantization parameter predictor when at least two quantization parameters are available. When only one quantization parameter is available, the available quantization parameter is set as the quantization parameter predictor. That is, if both of the left quantization parameter and the above quantization parameter are available, the average of the left quantization parameter and the above quantization parameter is set as the quantization parameter predictor. If one of the left quantization parameter and the above quantization parameter is available, the average of the available quantization parameter and the previous quantization parameter is set as the quantization parameter predictor. If both of the left quantization parameter and the above quantization parameter are unavailable, the previous quantization parameter is set as the quantization parameter predictor. The previous quantization parameter is a quantization parameter of a previous coding unit in coding order. The average is rounded off.

The quantization unit 104 quantizes the transformed block using a quantization matrix and the quantization parameter to generate a quantized block. The quantized block is provided to the inverse quantization unit 107 and the scanning unit 105.

The scanning unit 105 determines a scan pattern and applies the scan pattern to the quantized block. When CABAC (Context adaptive binary arithmetic coding) is used for entropy coding, the scan pattern is determined as follows.

In intra prediction, the distribution of the quantized transform coefficients varies according to the intra prediction mode and the size of the transform unit. Thus, the scan pattern is determined by the intra prediction mode and the size of the transform unit. The scan pattern is selected among a diagonal scan, vertical scan and horizontal scan. The quantized transform coefficients of the quantized block are split into significant flags, coefficient signs and coefficient levels. The scan pattern is applied to the significant flags, coefficient signs and coefficient levels respectively.

When the size of the transform unit is equal to or smaller than a first size, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the diagonal scan is selected for the other intra prediction modes. The first size is 8×8.

When the size of the transform unit is larger than the first size, the diagonal scan is selected for all intra prediction modes.

In inter prediction, the diagonal scan is used.

When the size of the transform unit is larger than a second size, the quantized block is divided into a plurality of subsets and scanned. The second size is 4×4. The scan pattern for scanning the subsets is the same as the scan pattern for scanning quantized transform coefficients of each subset. The quantized transform coefficients of each subset are scanned in the reverse direction. The subsets are also scanned in the reverse direction.

Last non-zero position is encoded and transmitted to the decoder. The last non-zero position specifies position of last non-zero quantized transform coefficient within the transform unit. Non-zero subset flags are determined and encoded. The non-zero subset flag indicates whether the subset contains non-zero coefficients or not. The non-zero subset flag is not defined for a subset covering a DC coefficient and a subset covering last non-zero coefficient.

The inverse quantization unit 107 inversely quantizes the quantized transform coefficients of the quantized block.

The inverse transform unit 108 inversely transforms the inverse quantized block to generate residual signals of the spatial domain.

The adder 109 generates a reconstructed block by adding the residual block and the prediction block.

The post-processing unit 110 performs a deblocking filtering process for removing blocking artifact generated in a reconstructed picture.

The picture storing unit 111 receives post-processed image from the post-processing unit 110, and stores the image in picture units. A picture may be a frame or a field.

The entropy coding unit 106 entropy-codes the one-dimensional coefficient information received from the scanning unit 105, intra prediction information received from the intra prediction unit 112, motion information received from the inter prediction unit 113, and so on.

Figure 3:
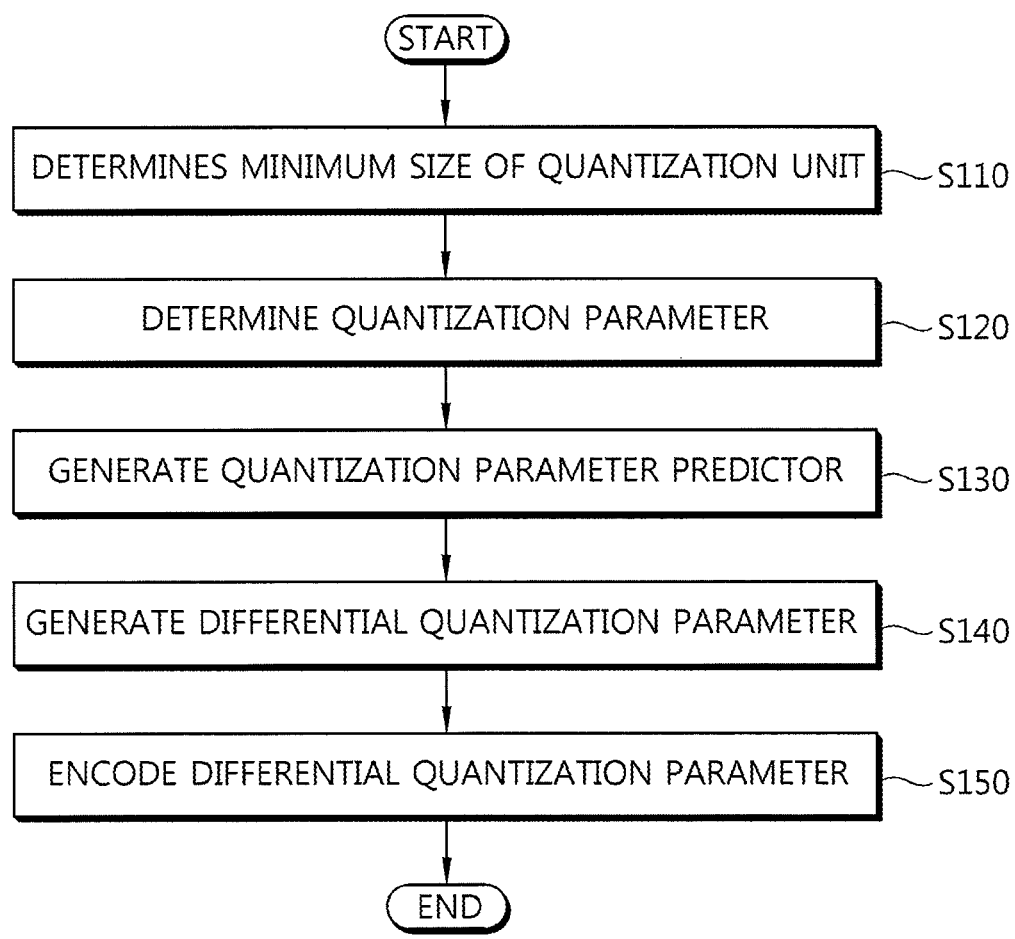
FIG. 3 is a flow chart illustrating a method of encoding quantization parameter according to an embodiment of the present invention.

FIG. 3 is a flow chart illustrating a method of encoding quantization parameter according to the present invention.

A minimum size of the quantization unit is determined (S110). The minimum size of the quantization unit is equal to a size of LCU or a size of sub-block of LCU. The minimum size of the quantization unit is determined per picture.

A quantization parameter is determined (S120). The quantization parameter is determined per quantization unit. If the size of the current coding unit is equal to or larger than the minimum size of the quantization unit, the current coding unit becomes the quantization unit. If the minimum quantization unit includes plural coding units, the quantization parameter is determined for the all the coding units within the minimum quantization unit.

A quantization parameter predictor is generated (S130). The quantization parameter predictor is also determined per quantization unit. If the size of the current coding unit is equal to or larger than the minimum size of the quantization unit, the quantization parameter for the current coding unit is generated. If the minimum quantization unit includes a plurality of coding unit, the quantization parameter predictor for the first coding unit in coding order is determined and used for the remaining coding units within the minimum quantization unit.

The quantization parameter is generated by using quantization parameters of neighboring coding units and quantization parameter of previous coding unit.

In one example, a left quantization parameter, an above quantization parameter and an above left quantization parameter are sequentially retrieved in this order, and the quantization parameter predictor is generated using one or two available quantization parameters. For example, an average of the first two available quantization parameters retrieved in that order is set as the quantization parameter predictor when at least two quantization parameters are available. When only one quantization parameter is available, the available quantization parameter is set as the quantization parameter predictor. The left quantization parameter is a quantization parameter of a left neighboring coding unit. The above quantization parameter is a quantization parameter of an above neighboring coding unit. The above left quantization parameter is a quantization parameter of an above left neighboring coding unit.

In another example, a left quantization parameter, an above quantization parameter and a previous quantization parameter are sequentially retrieved in this order, and the quantization parameter predictor is generated using one or two available quantization parameters. An average of the first two available quantization parameters retrieved in that order is set as the quantization parameter predictor when at least two quantization parameters are available. When only one quantization parameter is available, the available quantization parameter is set as the quantization parameter predictor. That is, if both of the left quantization parameter and the above quantization parameter are available, the average of the left quantization parameter and the above quantization parameter is set as the quantization parameter predictor. If one of the left quantization parameter and the above quantization parameter is available, the average of the available quantization parameter and the previous quantization parameter is set as the quantization parameter predictor. If both of the left quantization parameter and the above quantization parameter are unavailable, the previous quantization parameter is set as the quantization parameter predictor. The previous quantization parameter is a quantization parameter of a previous coding unit in coding order. The average is rounded off.

A differential quantization parameter (dQP) is generated by using the quantization parameter of the current coding unit and the quantization parameter predictor of the current coding unit (S140).

The differential quantization parameter is entropy-coded (S150). The dQP is converted into an absolute value of the dQP and a sign flag indicting the sign of the dQP. The absolute value of the dQP is binarized as truncated unary. Then, the absolute value and the sign flag are arithmetically coded. If the absolute value is zero, the sign flag does not exist.

Meanwhile, the minimum size of the quantization unit is also signaled to a decoding apparatus.

Two steps are required to signal the minimum size of the quantization unit in the current HM (HEVC Test Model) under construction. Firstly, it is determined whether the quantization parameter is adjusted per LCU or sub-block of LCU in sequence level, and if it is determined that the quantization parameter is adjusted per sub-block of LCU in sequence level, then the minimum size of the quantization unit is determined in picture level. A first parameter (cu_qp_delta_enabled_flag) indicating whether the quantization parameter is adjusted per LCU or sub-block of LCU is included in the SPS (sequence parameter set). If the first parameter indicates that the quantization parameter is adjusted per sub-block of LCU, a second parameter (max_cu_qp_delta-depth) is included in the PPS (picture parameter set). The second parameter specifies the minimum size of the quantization unit smaller than the size of LCU. Therefore, complexity of coding process increases and two parameter should be transmitted if the minimum size of the quantization unit is used at least one picture.

In the present invention, it is omitted to determine whether the minimum size of the quantization unit is smaller than the size of LCU or not on sequence level. That is, the minimum size of the quantization unit is determined for each picture. Therefore, one parameter (for example, cu_qp_delta_enabled_info) may be used for specifying the minimum size of the quantization unit. The parameter specifies depth of the minimum quantization unit. The minimum size of the quantization unit may be equal to a size of LCU or a size of sub-block of LCU. Accordingly, the coding bits required for signaling the minimum size of the quantization unit decreases and the complexity of coding process also decreases.

A predetermined quantization matrix and a user-defined quantization matrix may be used for quantizing the transformed block. When one or more user-defined quantization matrices are used, the one or more user-defined quantization matrices should be included in the SPS or PPS. To reduce signaling bits of the user-defined quantization matrix, the coefficients of the user-defined quantization matrix are coded using DPCM (differential pulse code modulation). A diagonal scan is applied to the coefficients for DPCM.

When a size of the user-defined quantization matrix is larger than a predetermined size, the coefficients of the user-defined quantization matrix are down-sampled to reduce the signaling bits and then coded using DPCM. The predetermined size may be 8×8. For example, if the size of the user-defined quantization matrix is 16×16, coefficients other than DC coefficient of the user-defined quantization matrix are down-sampled using 4:1 down sampling. The DC coefficient is signaled separately from the down sampled matrix.

Figure 4:
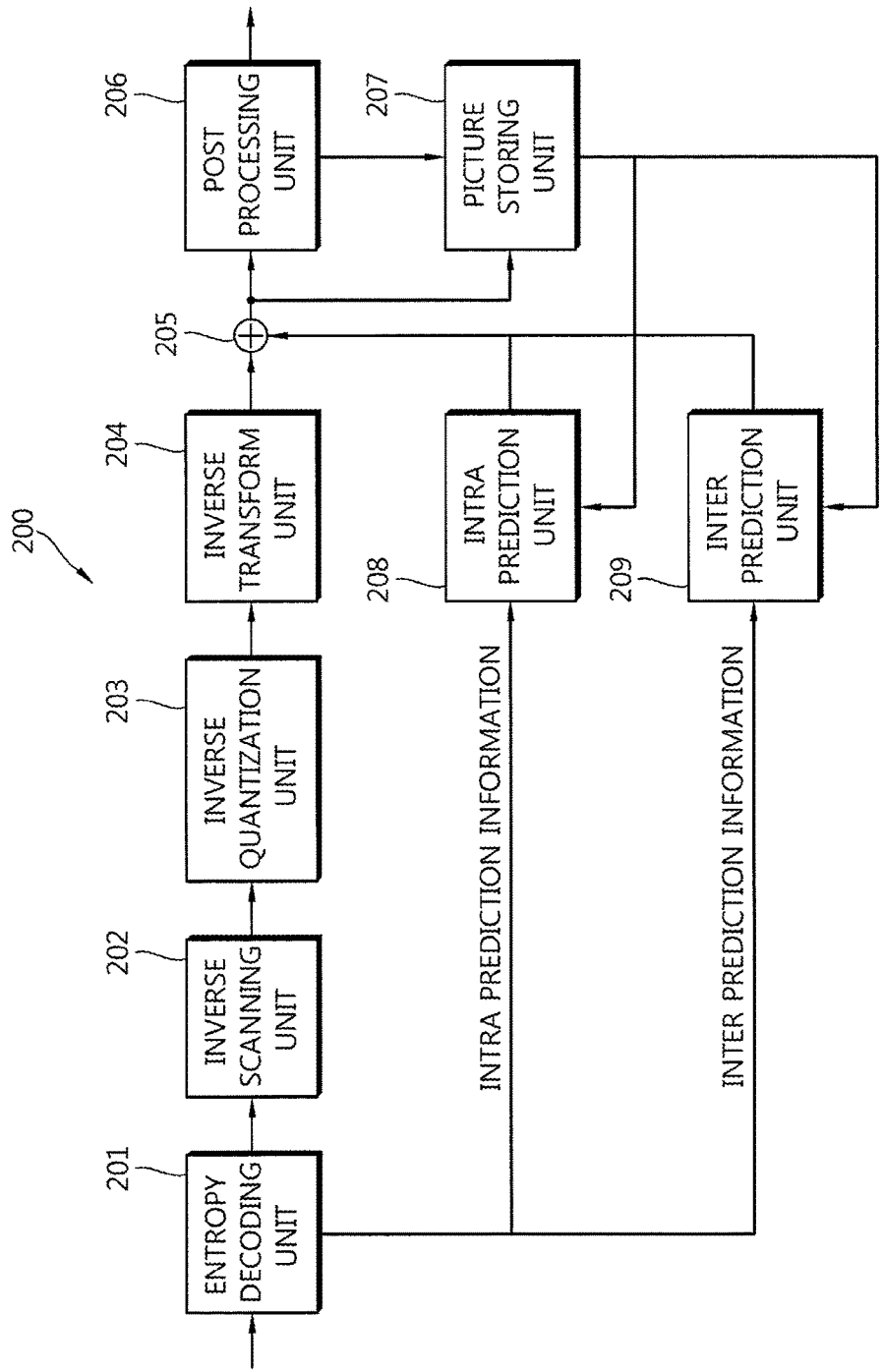
FIG. 4 is a block diagram of an image decoding apparatus according to an embodiment of the present invention.

FIG. 4 is a block diagram of an image decoding apparatus 200 according to the present invention.

The image decoding apparatus 200 according to the present invention includes an entropy decoding unit 201, an inverse scanning unit 202, an inverse quantization unit 203, an inverse transform unit 204, an adder 205, a post processing unit 206, a picture storing unit 207, an intra prediction unit 208 and an inter prediction unit 209.

The entropy decoding unit 201 extracts the intra prediction information, the inter prediction information and the one-dimensional coefficient information from a received bit stream. The entropy decoding unit 201 transmits the inter prediction information to the inter prediction unit 209, the intra prediction information to the intra prediction unit 208 and the coefficient information to the inverse scanning unit 202.

The inverse scanning unit 202 uses an inverse scan pattern to generate two dimensional quantized block. It is supposed that CABAC is used as entropy coding method. The inverse scan pattern is one of the diagonal scan, the vertical scan and the horizontal scan.

In intra prediction, the inverse scan pattern is determined by the intra prediction mode and the size of the transform unit. The inverse scan pattern is selected among a diagonal scan, vertical scan and horizontal scan. The selected inverse scan pattern is applied to the significant flags, the coefficient signs and the coefficient levels respectively generate the quantized block.

When the size of the transform unit is equal to or smaller than the first size, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the diagonal scan is selected for the other intra prediction modes. The first size is 8×8.

When the size of the transform unit is larger than the first size, the diagonal scan is selected for all intra prediction modes.

In inter prediction, the diagonal scan is used.

When the size of the transform unit is larger than the second size, the significant flags, the coefficient signs and the coefficient levels are inversely scanned in the unit of the subset to generate subsets. And the subsets are inversely scanned to generate the quantized block. The second size is 4×4.

The inverse scan pattern used for generating each subset is the same as the inverse scan pattern used for generating the quantized block. The significant flags, the coefficient signs and the coefficient levels are scanned in the reverse direction. The subsets are also scanned in the reverse direction.

The last non-zero position and the non-zero subset flags are received from the encoder. The last non-zero position is used to determine the number of subsets to be generated. The non-zero subset flags are used to determine the subsets to be generated by applying the inverse scan pattern. The subset covering the DC coefficient and the subset covering the last non-zero coefficient are generated using the inverse scan pattern because the non-zero subset flags for a subset covering a DC coefficient and a subset covering last non-zero coefficient are not transmitted.

The inverse quantization unit 203 receives the differential quantization parameter from the entropy decoding unit 201 and generates the quantization parameter predictor. The quantization parameter predictor is generated through the same operation of the quantization unit 104 of FIG. 1. Then, the inverse quantization unit 203 adds the differential quantization parameter and the quantization parameter predictor to generate the quantization parameter of the current coding unit. If the current coding unit is equal to or larger than the minimum quantization unit and the differential quantization parameter for the current coding unit is not received from the encoder, the differential quantization parameter is set to 0.

The inverse quantization unit 203 inversely quantizes the quantized block.

The inverse transform unit 204 inversely transforms the inverse-quantized block to restore a residual block. The inverse transform type is adaptively determined according to the prediction mode and the size of the transform unit. The inverse transform type is the DCT-based integer transform or the DST-based integer transform.

The intra prediction unit 208 restores the intra prediction mode of the current prediction unit using the received intra prediction information, and generates a prediction block according to the restored intra prediction mode. The size of the prediction block is the same as that of the transform unit. The intra prediction unit 208 generates reference pixels if there are unavailable reference pixels of a current block, and filters adaptively the reference pixels of the current block according to the size of the current block and the intra prediction mode. The size of the current block is the same as that of the transform unit.

The inter prediction unit 209 restores the motion information of the current prediction unit using the received inter prediction information, and generates a prediction block using the motion information.

The post-processing unit 206 operates the same as the post-processing unit 110 of FIG. 1.

The picture storing unit 207 receives post-processed image from the post-processing unit 206, and stores the image in picture units. A picture may be a frame or a field.

The adder 205 adds the restored residual block and a prediction block to generate a reconstructed block.

Figure 5:
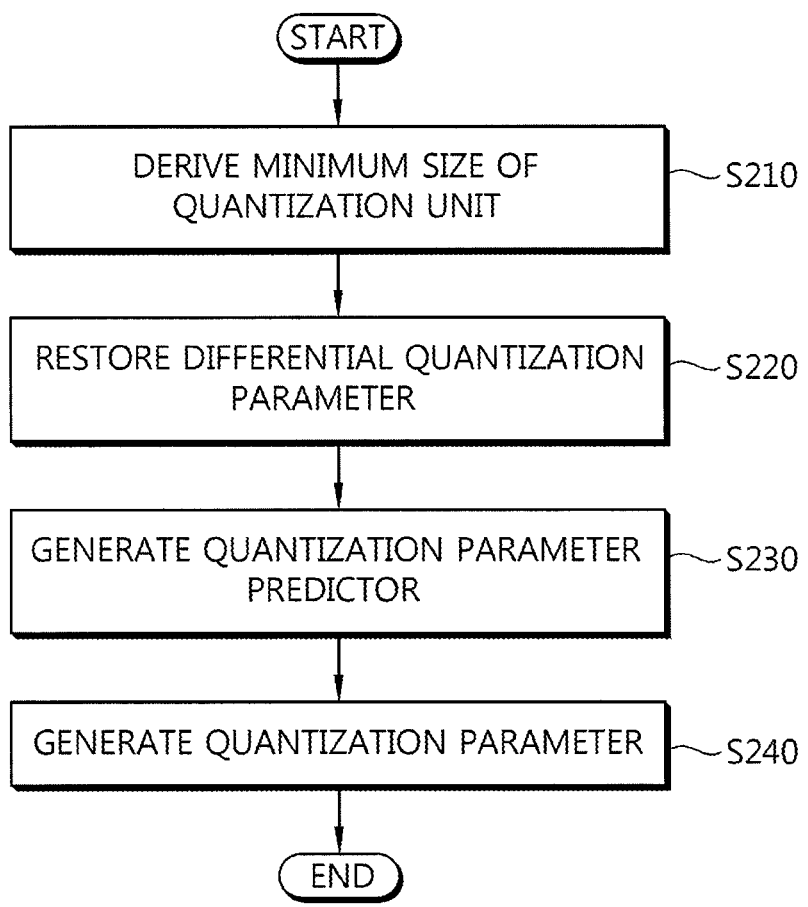
FIG. 5 is a flow chart illustrating a method of decoding a quantization parameter according to an embodiment of the present invention.

FIG. 5 is a flow chart illustrating a method of decoding quantization parameter according to the present invention.

The minimum size of the quantization unit is derived (S210). The parameter (cu_qp_delta_enabled_info) specifying the depth of the minimum quantization unit is extracted from PPS. The minimum size of the quantization unit is derived per picture as follows:

Log 2(MinQUSize)=Log 2(MaxCUSize)–*cu_qp_delta_enabled_info* wherein the MinQUSize is the minimum size of the quantization unit, and the MaxCUSize is the size of LCU.

The differential quantization parameter (dQP) of the current coding unit is restored (S220). The dQP is restored per quantization unit. For example, if the size of the current coding unit is equal to or larger than the minimum size of the quantization unit, the dQP is restored for the current coding unit. If the current coding unit does not contain an encoded dQP, the dQP is set to zero. If the quantization unit includes plural coding units, a first coding unit containing at least one non-zero coefficient in the decoding order contains the encoded dQP.

The encoded dQP is arithmetically decoded to generate an absolute value of the dQP and a sign flag indicting the sign of the dQP. The absolute value of the dQP is bin string binarized as truncated unary. Then, the dQP is restored from the bin string of the absolute value and the sign flag. If the absolute value is zero, the sign flag does not exist.

The quantization parameter predictor of the current coding unit is generated (S230). The quantization parameter predictor is generated using the same operation of step 130 of FIG. 3. If a quantization unit includes plural coding units, the quantization parameter predictor of the first coding unit in the decoding order is generated, and the generated quantization parameter predictor is used for all the coding units within the quantization unit.

The quantization parameter is generated using the dQP and the quantization parameter predictor (S240).

Meanwhile, the user-defined quantization matrices are also restored. A set of the user-defined quantization matrices is received from the encoding apparatus through the SPS or the PPS. The user-defined quantization matrix is restored using inverse DPCM. The diagonal scan is used for the DPCM. When the size of the user-defined quantization matrix is larger than 8×8, the user-defined quantization matrix is restored by up-sampling the coefficients of the received 8×8 quantization matrix. The DC coefficient of the user-defined quantization matrix is extracted from the SPS or the PPS. For example, if the size of the user-defined quantization matrix is 16×16, coefficients of the received 8×8 quantization matrix are up-sampled using 1:4 up-sampling.

Figure 6:
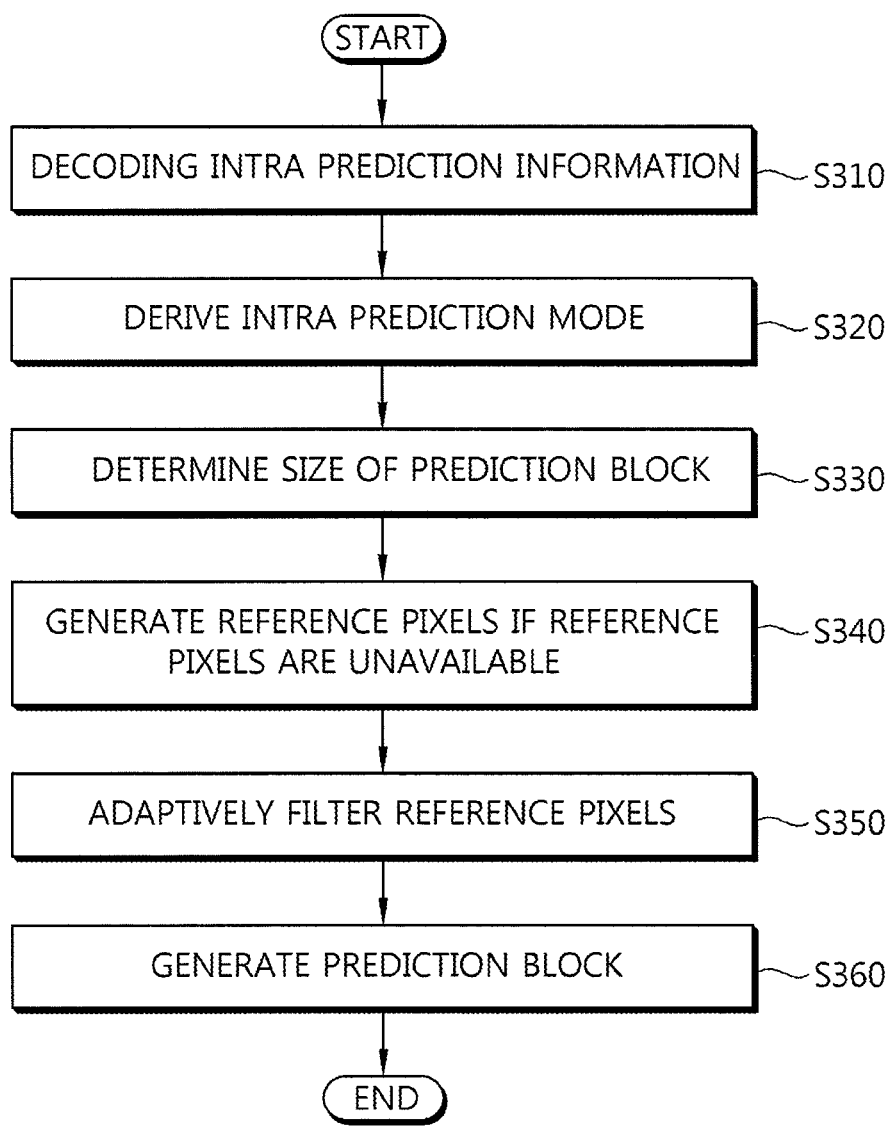
FIG. 6 is a flow chart illustrating a method of generating a prediction block in intra prediction according to an embodiment of the present invention.

FIG. 6 is a flow chart illustrating a method of generating a prediction block in intra prediction according to the present invention.

Intra prediction information of the current prediction unit is entropy-decoded (S310).

The intra prediction information includes a mode group indicator and a prediction mode index. The mode group indicator is a flag indicating whether the intra prediction mode of the current prediction unit belongs to a most probable mode group (MPM group). If the flag is 1, the intra prediction unit of the current prediction unit belongs to the MPM group. If the flag is 0, the intra prediction unit of the current prediction unit belongs to a residual mode group. The residual mode group includes all intra prediction modes other than the intra prediction modes belonging to the MPM group. The prediction mode index specifies the intra prediction mode of the current prediction unit within the group specified by the mode group indicator.

The intra prediction mode of the current prediction unit is derived using the intra prediction information (S320).

Figure 7:
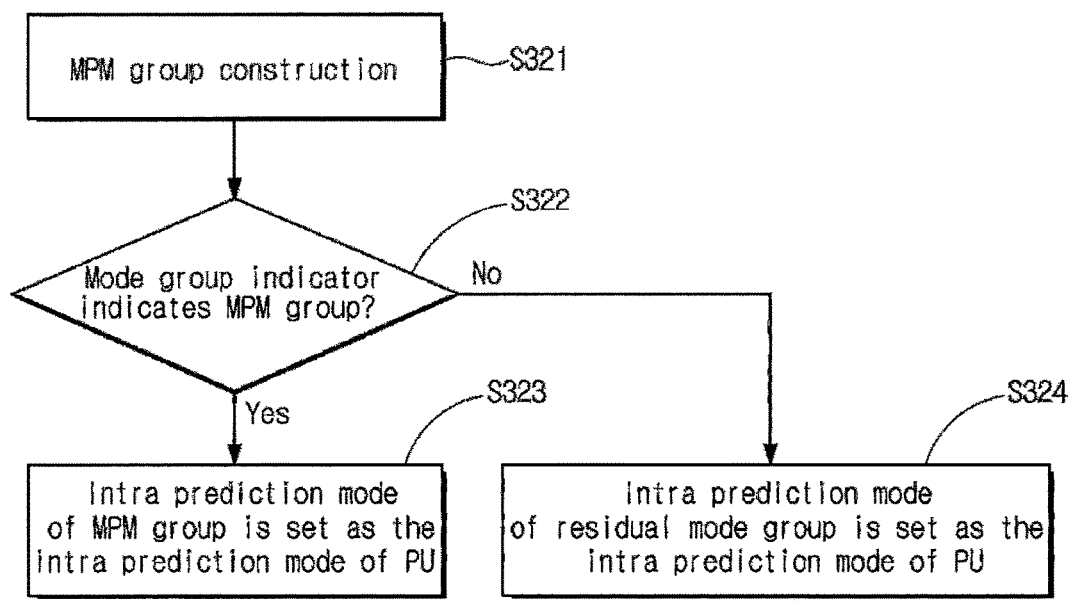
FIG. 7 is a flow chart illustrating a procedure of deriving an intra prediction mode according to an embodiment of the present invention.

FIG. 7 is a flow chart illustrating a procedure of deriving intra prediction mode according to the present invention. The intra prediction mode of the current prediction unit is restored using the following ordered steps.

The MPM group is constructed using intra prediction modes of the neighboring prediction units (S321). The intra prediction modes of the MPM group are adaptively determined by a left intra prediction mode and an above intra prediction mode. The left intra prediction mode is the intra prediction mode of the left neighboring prediction unit, and the above intra prediction mode is the intra prediction mode of the above neighboring prediction unit. The MPM group is comprised of three intra prediction modes.

If the left or above neighboring prediction unit does not exist, the intra prediction mode of the left or above neighboring unit is set as unavailable. For example, if the current prediction unit is located at the left or upper boundary of a picture, the left or above neighboring prediction unit does not exist. If the left or above neighboring unit is located within other slice or other tile, the intra prediction mode of the left or above neighboring unit is set as unavailable. If the left or above neighboring unit is inter-coded, the intra prediction mode of the left or above neighboring unit is set as unavailable. If the above neighboring unit is located within other LCU, the intra prediction mode of the left or above neighboring unit is set as unavailable.

When both of the left intra prediction mode and the above intra prediction mode are available and are different each other, the left intra prediction mode and the above intra prediction mode are included in the MPM group and one additional intra prediction mode is added to the MPM group. Index 0 is assigned to one intra prediction mode of small mode number and index 1 is assigned to the other. Or index 0 is assigned to the left intra prediction mode and index 1 is assigned to the above intra prediction mode. The added intra prediction mode is determined by the left and above intra prediction modes as follows.

If one of the left and above intra prediction modes is a non-directional mode and the other is a directional mode, the other non-directional mode is added to the MPM group. For example, if the one of the left and above intra prediction modes is the DC mode, the planar mode is added to the MPM group. If the one of the left and above intra prediction modes is the planar mode, the DC mode is added to the MPM group. If both of the left and above intra prediction modes are non-directional modes, the vertical mode is added to the MPM group. If both of the left and above intra prediction modes are directional modes, the DC mode or the planar mode is added to the MPM group.

When only one of the left intra prediction mode and the above intra prediction mode is available, the available intra prediction mode is included in the MPM group and two additional intra prediction modes are added to the MPM group. The added two intra prediction modes are determined by the available intra prediction modes as follows.

If the available intra prediction mode is a non-directional mode, the other non-directional mode and the vertical mode are added to the MPM group. For example, if the available intra prediction mode is the DC mode, the planar mode and the vertical mode are added to the MPM group. If the available intra prediction mode is the planar mode, the DC mode and the vertical mode are added to the MPM group. If the available intra prediction mode is a directional mode, two non-directional modes (DC mode and planar mode) are added to the MPM group.

When both of the left intra prediction mode and the above intra prediction mode are available and are same each other, the available intra prediction mode is included in the MPM group and two additional intra prediction modes are added to the MPM group. The added two intra prediction modes are determined by the available intra prediction modes as follows.

If the available intra prediction mode is a directional mode, two neighboring directional modes are added to the MPM group. For example, if the available intra prediction mode is the mode 23, the left neighboring mode (mode 1) and the right neighboring mode (mode 13) are added to the MPM group. If the available intra prediction mode is the mode 30, the two neighboring modes (mode 2 and mode 16) are added to the MPM group. If the available intra prediction mode is a non-directional mode, the other non-directional mode and the vertical mode are added to the MPM group. For example, if the available intra prediction mode is the DC mode, the planar mode and the vertical mode are added to the MPM group.

When both of the left intra prediction mode and the above intra prediction mode are unavailable, three additional intra prediction modes are added to the MPM group. The three intra prediction modes are the DC mode, the planar mode and the vertical mode. Indexes 0, 1 and 2 are assigned to the three intra prediction modes in the order of the DC mode, the planar mode and the vertical mode or in the order of the planar mode, the DC mode and the vertical mode.

It is determined whether the mode group indicator indicates the MPM group (S322).

If the mode group indicator indicates the MPM group, the intra prediction of the MPM group specified by the prediction mode index is set as the intra prediction mode of the current prediction unit (S323).

If the mode group indicator does not indicate the MPM group, the intra prediction of the residual mode group specified by the prediction mode index is set as the intra prediction mode of the current prediction unit (S324). The intra prediction mode of the current unit is derived using the prediction mode index and the intra prediction modes of the MPM group as the following ordered steps.

Among the three intra prediction modes of the MPM group, the intra prediction mode with lowest mode number is set to a first candidate, the intra prediction mode with middle mode number is set to a second candidate, and the intra prediction mode with highest mode number is set to a third candidate.

1) The prediction mode index is compared with the first candidate. If the prediction mode index is equal to or greater than the first candidate of the MPM group, the value of the prediction mode index is increased by one. Otherwise, the value of the prediction mode index is maintained.

2) The prediction mode index is compared with the second candidate. If the prediction mode index is equal to or greater than the second candidate of the MPM group, the value of the prediction mode index is increased by one. Otherwise, the value of the prediction mode index is maintained.

3) The prediction mode index is compared with the third candidate. If the prediction mode index is equal to or greater than the third candidate of the MPM group, the value of the prediction mode index is increased by one. Otherwise, the value of the prediction mode index is maintained.

4) The value of the final prediction mode index is set as the mode number of the intra prediction mode of the current prediction unit.

A size of the prediction block is determined based on the transform size information specifying the size of the transform unit (S330). The transform size information may be one or more split_transform_flags specifying the size of the transform unit.

If the size of the transform unit is equal to the size of the current prediction unit, the size of the prediction block is equal to the size of the current prediction unit.

If the size of the transform unit is smaller than the size of the current prediction unit, the size of the prediction block is equal to the size of the transform unit. In this case, a process of generating a reconstructed block is performed on each sub-block of the current prediction unit. That is, a prediction block and a residual block of a current sub-block are generated and a reconstructed block of each sub-block is generated by adding the prediction block and the residual block. Then, a prediction block, a residual block and a reconstructed block of the next sub-block in decoding order are generated. The restored intra prediction mode is used to generate all prediction blocks of all sub-block. Some pixels of the reconstructed block of the current sub-block are used as reference pixels of the next sub-block. Therefore, it is possible to generate a prediction block which is more similar to the original sub-block.

Next, it is determined whether all reference pixels of the current block are available, and reference pixels are generated if one or more reference pixels are unavailable (S340).

The current block is the current prediction unit or the current sub-block. The size of the current block is the size of the transform unit.

Figure 8:
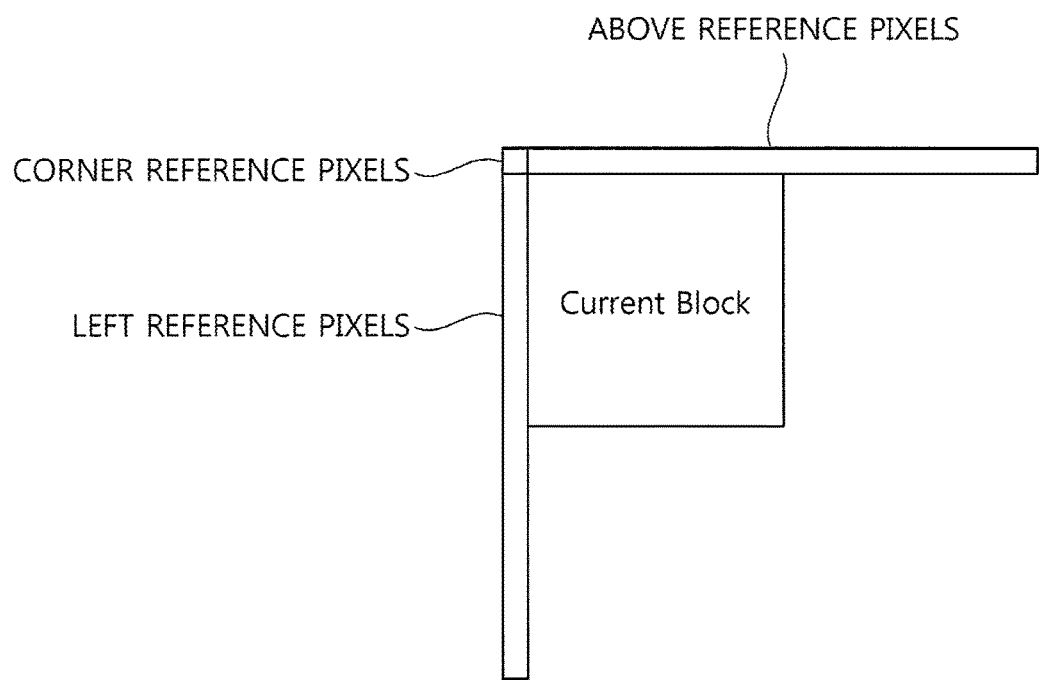
FIG. 8 is a conceptual diagram illustrating positions of reference pixels of a current block according to an embodiment of the present invention.

FIG. 8 is a conceptual diagram illustrating the positions of reference pixels of the current block according to the present invention. As shown in FIG. 8, the reference pixels of the current blocks are comprised of above reference pixels located at (x=0, . . . , 2N−1, y=−1), left reference pixels located at (x=1−, y=0, . . . , 2M−1) and a corner pixel located at (x=−1, y=−1). N is the width of the current block and M is the height of the current block.

If reconstructed pixels do not exist at corresponding positions or reconstructed pixels are located within another slice, the reference pixels are set as unavailable. In constrained intra prediction mode (CIP mode), the reconstructed pixels of inter mode are also set as unavailable.

If one or more reference pixels are unavailable, one or more reference pixels are generated for the one or more unavailable reference pixels as follows.

If all reference pixels are unavailable, the value of $2^{L-1}$ is substituted for the values of all the reference pixels. The value of L is the number of bits used to represent luminance pixel value.

If available reference pixels are located at only one side of the unavailable reference pixel, the value of the reference pixel nearest to the unavailable pixel is substituted for the unavailable reference pixel.

If available reference pixels are located at both sides of the unavailable reference pixel, the average value of the reference pixels nearest to the unavailable pixel in each side or the value of the reference pixel nearest to the unavailable pixel in a predetermined direction is substituted for each unavailable reference pixel.

Next, the reference pixels are adaptively filtered based on the intra prediction mode and the size of the current block (S350). The size of the current block is the size of the transform unit.

In the DC mode, the reference pixels are not filtered. In the vertical mode and the horizontal mode, the reference pixels are not filtered. In the directional modes other than the vertical and horizontal modes, the reference pixels are adaptively according to the size of the current block.

If the size of the current block is 4×4, the reference pixels are not filtered in all intra prediction modes. For the size 8×8, 16×16 and 32×32, the number of intra prediction mode where the reference pixels are filtered increases as the size of the current block becomes larger. For example, the reference pixels are not filtered in the vertical mode and a predetermined number of neighboring intra prediction mode of the vertical mode. The reference pixels are also not filtered in the horizontal mode and the predetermined number of neighboring intra prediction mode of the horizontal mode. The predetermined number is one of 0~7 and decreases as the size of the current block increases.

Next, a prediction block of the current block is generated using the reference pixels according to the restored intra prediction mode (S360).

In the DC mode, the prediction pixel of the prediction block which is not adjacent to the reference pixel is generated by averaging the N reference pixels located at (x=0, . . . N−1, y=−1) and the M reference pixels located at (x=−1, y=0, . . . M−1). The prediction pixel adjacent to the reference pixel is generated using the average value and one or two adjacent reference pixels.

In the vertical mode, the prediction pixels which are not adjacent to the left reference pixel are generated by copying the value of the vertical reference pixel. The prediction pixels which are adjacent to the left reference pixel are generated by the vertical reference pixel and variance between the corner pixel and the left neighboring pixel.

In the horizontal mode, the prediction pixels are generated using the same method.

Figure 9:
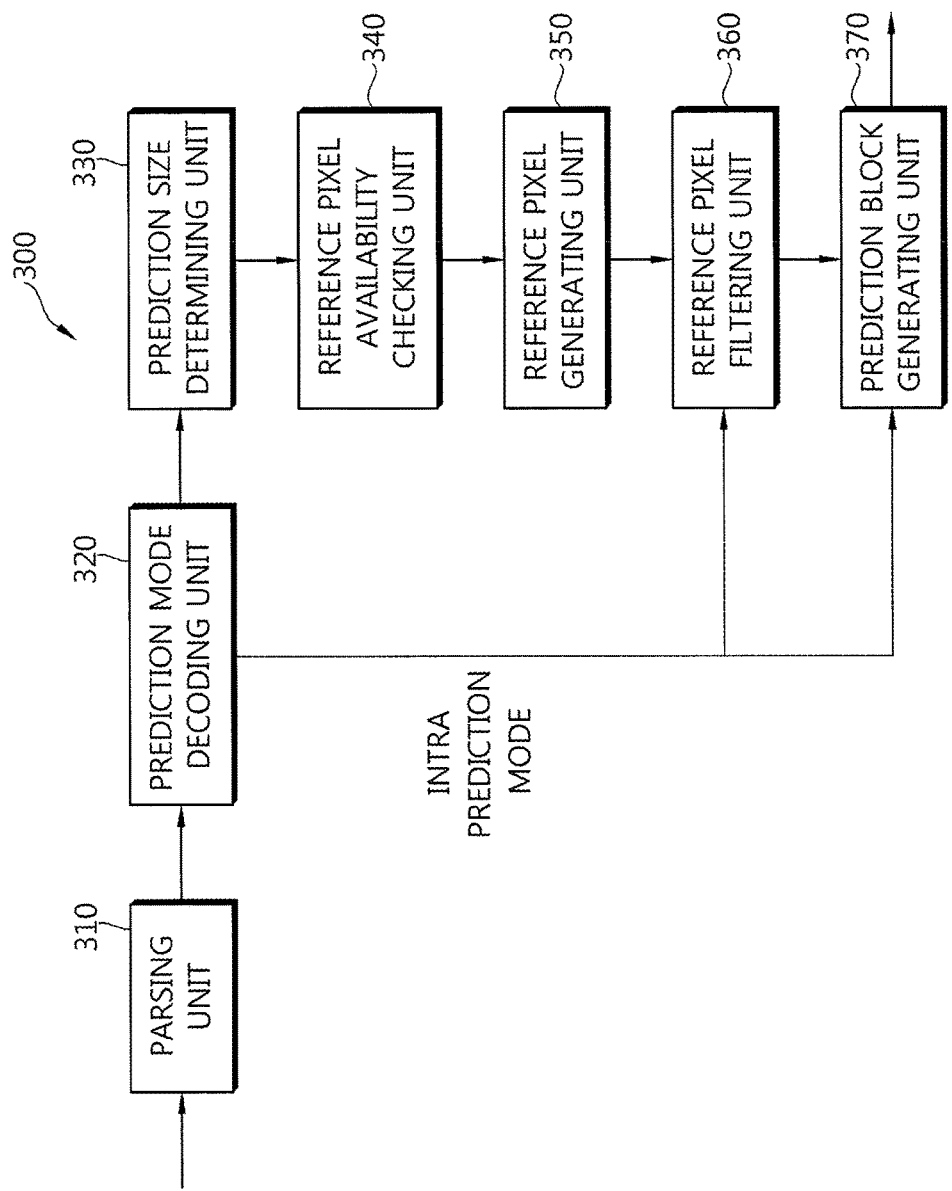
FIG. 9 is a block diagram illustrating an apparatus of generating a prediction block in intra prediction according to an embodiment of the present invention.

FIG. 9 is a block diagram illustrating an apparatus of generating a prediction block in intra prediction according to the present invention.

The apparatus 300 according to the present invention includes a parsing unit 310, a prediction mode decoding unit 320, a prediction size determining unit 330, a reference availability checking unit 340, a reference pixel generating unit 350, a reference pixel filtering unit 360 and a prediction block generating unit 370.

The parsing unit 310 restores the intra prediction information of the current prediction unit from the bit stream.

The intra prediction information includes the mode group indicator and a prediction mode index. The mode group indicator is a flag indicating whether the intra prediction mode of the current prediction unit belongs to a most probable mode group (MPM group). If the flag is 1, the intra prediction unit of the current prediction unit belongs to the MPM group. If the flag is 0, the intra prediction unit of the current prediction unit belongs to a residual mode group. The residual mode group includes all intra prediction modes other than the intra prediction modes belonging to the MPM group. The prediction mode index specifies the intra prediction mode of the current prediction unit within the group specified by the mode group indicator.

The prediction mode decoding unit 320 includes a MPM group constructing unit 321 and a prediction mode restoring unit 322.

The MPM group constructing unit 321 constructs the MPM group of the current prediction unit. The MPM group is constructed using intra prediction modes of the neighboring prediction units. The intra prediction modes of the MPM group are adaptively determined by a left intra prediction mode and an above intra prediction mode. The left intra prediction mode is the intra prediction mode of the left neighboring prediction unit, and the above intra prediction mode is the intra prediction mode of the above neighboring prediction unit. The MPM group is comprised of three intra prediction modes.

The MPM group constructing unit 321 checks the availability of the left intra prediction mode and the above intra prediction mode. If the left or above neighboring prediction unit does not exist, the intra prediction mode of the left or above neighboring unit is set as unavailable. For example, if the current prediction unit is located at the left or upper boundary of a picture, the left or above neighboring prediction unit does not exist. If the left or above neighboring unit is located within other slice or other tile, the intra prediction mode of the left or above neighboring unit is set as unavailable. If the left or above neighboring unit is inter-coded, the intra prediction mode of the left or above neighboring unit is set as unavailable. If the above neighboring unit is located within other LCU, the intra prediction mode of the left or above neighboring unit is set as unavailable.

The MPM group constructing unit 321 constructs the MPM group as follows.

When both of the left intra prediction mode and the above intra prediction mode are available and are different each other, the left intra prediction mode and the above intra prediction mode are included in the MPM group and one additional intra prediction mode is added to the MPM group. Index 0 is assigned to one intra prediction mode of small mode number and index 1 is assigned to the other. Or index 0 is assigned to the left intra prediction mode and index 1 is assigned to the above intra prediction mode. The added intra prediction mode is determined by the left and above intra prediction modes as follows.

If one of the left and above intra prediction modes is a non-directional mode and the other is a directional mode, the other non-directional mode is added to the MPM group. For example, if the one of the left and above intra prediction modes is the DC mode, the planar mode is added to the MPM group. If the one of the left and above intra prediction modes is the planar mode, the DC mode is added to the MPM group. If both of the left and above intra prediction modes are non-directional modes, the vertical mode is added to the MPM group. If both of the left and above intra prediction modes are directional modes, the DC mode or the planar mode is added to the MPM group.

When only one of the left intra prediction mode and the above intra prediction mode is available, the available intra prediction mode is included in the MPM group and two additional intra prediction modes are added to the MPM group. The added two intra prediction modes are determined by the available intra prediction modes as follows.

If the available intra prediction mode is a non-directional mode, the other non-directional mode and the vertical mode are added to the MPM group. For example, if the available intra prediction mode is the DC mode, the planar mode and the vertical mode are added to the MPM group. If the available intra prediction mode is the planar mode, the DC mode and the vertical mode are added to the MPM group. If the available intra prediction mode is a directional mode, two non-directional modes (DC mode and planar mode) are added to the MPM group.

When both of the left intra prediction mode and the above intra prediction mode are available and are same each other, the available intra prediction mode is included in the MPM group and two additional intra prediction modes are added to the MPM group. The added two intra prediction modes are determined by the available intra prediction modes as follows.

If the available intra prediction mode is a directional mode, two neighboring directional modes are added to the MPM group. For example, if the available intra prediction mode is the mode 23, the left neighboring mode (mode 1) and the right neighboring mode (mode 13) are added to the MPM group. If the available intra prediction mode is the mode 30, the two neighboring modes (mode 2 and mode 16) are added to the MPM group. If the available intra prediction mode is a non-directional mode, the other non-directional mode and the vertical mode are added to the MPM group. For example, if the available intra prediction mode is the DC mode, the planar mode and the vertical mode are added to the MPM group.

When both of the left intra prediction mode and the above intra prediction mode are unavailable, three additional intra prediction modes are added to the MPM group. The three intra prediction modes are the DC mode, the planar mode and the vertical mode. Indexes 0, 1 and 2 are assigned to the three intra prediction modes in the order of the DC mode, the planar mode and the vertical mode or in the order of the planar mode, the DC mode and the vertical mode.

The prediction mode restoring unit 322 derives the intra prediction mode of the current prediction unit using the mode group indicator and the prediction mode index as follows.

The prediction mode restoring unit 322 determines whether the mode group indicator indicates the MPM group.

If the mode group indicator indicates the MPM group, the prediction mode restoring unit 322 determines the intra prediction of the MPM group specified by the prediction mode index as the intra prediction mode of the current prediction unit.

If the mode group indicator does not indicate the MPM group, the prediction mode restoring unit 322 determines the intra prediction of the residual mode group specified by the prediction mode index as the intra prediction mode of the current prediction unit. The intra prediction mode of the current unit is derived using the prediction mode index and the intra prediction modes of the MPM group as the following ordered steps.

Among the three intra prediction modes of the MPM group, the intra prediction mode with lowest mode number is set to a first candidate, the intra prediction mode with middle mode number is set to a second candidate, and the intra prediction mode with highest mode number is set to a third candidate.

1) The prediction mode index is compared with the first candidate. If the prediction mode index is equal to or greater than the first candidate of the MPM group, the value of the prediction mode index is increased by one. Otherwise, the value of the prediction mode index is maintained.

2) The prediction mode index is compared with the second candidate. If the prediction mode index is equal to or greater than the second candidate of the MPM group, the value of the prediction mode index is increased by one. Otherwise, the value of the prediction mode index is maintained.

3) The prediction mode index is compared with the third candidate. If the prediction mode index is equal to or greater than the third candidate of the MPM group, the value of the prediction mode index is increased by one. Otherwise, the value of the prediction mode index is maintained.

4) The value of the final prediction mode index is set as the mode number of the intra prediction mode of the current prediction unit.

The prediction size determining unit 330 determines the size of the prediction block based on the transform size information specifying the size of the transform unit. The transform size information may be one or more split_transform_flags specifying the size of the transform unit.

If the size of the transform unit is equal to the size of the current prediction unit, the size of the prediction block is equal to the size of the current prediction unit.

If the size of the transform unit is smaller than the size of the current prediction unit, the size of the prediction block is equal to the size of the transform unit. In this case, a process of generating a reconstructed block is performed on each sub-block of the current prediction unit. That is, a prediction block and a residual block of a current sub-block are generated and a reconstructed block of each sub-block is generated by adding the prediction block and the residual block. Then, a prediction block, a residual block and a reconstructed block of the next sub-block in decoding order are generated. The restored intra prediction mode is used to generate all prediction blocks of all sub-block. Some pixels of the reconstructed block of the current sub-block are used as reference pixels of the next sub-block. Therefore, it is possible to generate a prediction block which is more similar to the original sub-block.

The reference pixel availability checking unit 340 determines whether all reference pixels of the current block are available. The current block is the current prediction unit or the current sub-block. The size of the current block is the size of the transform unit.

The reference pixel generating unit 350 generates reference pixels if one or more reference pixels of the current block are unavailable.

If all reference pixels are unavailable, the value of $2^{L-1}$ is substituted for the values of all the reference pixels. The value of L is the number of bits used to represent luminance pixel value.

If available reference pixels are located at only one side of the unavailable reference pixel, the value of the reference pixel nearest to the unavailable pixel is substituted for the unavailable reference pixel.

If available reference pixels are located at both sides of the unavailable reference pixel, the average value of the reference pixels nearest to the unavailable pixel in each side or the value of the reference pixel nearest to the unavailable pixel in a predetermined direction is substituted for each unavailable reference pixel.

The reference pixel filtering unit 360 adaptively filters the reference pixels based on the intra prediction mode and the size of the current block.

In the DC mode, the reference pixels are not filtered. In the vertical mode and the horizontal mode, the reference pixels are not filtered. In the directional modes other than the vertical and horizontal modes, the reference pixels are adaptively according to the size of the current block.

If the size of the current block is 4×4, the reference pixels are not filtered in all intra prediction modes. For the size 8×8, 16×16 and 32×32, the number of intra prediction mode where the reference pixels are filtered increases as the size of the current block becomes larger. For example, the reference pixels are not filtered in the vertical mode and a predetermined number of neighboring intra prediction mode of the vertical mode. The reference pixels are also not filtered in the horizontal mode and the predetermined number of neighboring intra prediction mode of the horizontal mode. The predetermined number is one of 0~7 and decreases as the size of the current block increases.

The prediction block generating unit 370 generates a prediction block of the current block using the reference pixels according to the restored intra prediction mode.

In the DC mode, the prediction pixel of the prediction block which is not adjacent to the reference pixel is generated by averaging the N reference pixels located at (x=0, . . . N–1, y=–1) and the M reference pixels located at (x=–1, y=0, . . . M–1). The prediction pixel adjacent to the reference pixel is generated using the average value and one or two adjacent reference pixels.

In the vertical mode, the prediction pixels which are not adjacent to the left reference pixel are generated by copying the value of the vertical reference pixel. The prediction pixels which are adjacent to the left reference pixel are generated by the vertical reference pixel and variance between the corner pixel and the left neighboring pixel.

In the horizontal mode, the prediction pixels are generated using the same method.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for generating a prediction block in intra prediction, the method comprising:
    restoring a mode group indicator and a prediction mode index;
    constructing a most probable mode (MPM) group including three intra prediction modes;
    determining an intra prediction mode specified by an intra prediction mode index in the MPM group as an intra prediction mode of a current block if the mode group indicator indicates the MPM group, and deriving the intra prediction mode of the current block using the prediction mode index and the three intra prediction modes of the MPM group if the mode group indicator does not indicate the MPM group;
    determining a size of the prediction block based on transform size information;
    determining whether all reference pixels of the current block are available;
    generating reference pixels if one or more reference pixels of the current block are unavailable;
    adaptively filtering the reference pixels based on the intra prediction mode of the current block and a size of the current block; and
    generating the prediction block using the reference pixels based on the intra prediction mode of the current block,
    wherein when only one of a left intra prediction mode and an above intra prediction mode is available, the MPM group includes the available intra prediction mode and two additional intra prediction modes, and if the available intra prediction mode is one of two non-directional intra prediction modes, the two additional intra prediction modes are the other of the two non-directional intra prediction modes and a vertical mode, and if the available intra prediction mode is one of directional intra prediction modes, the two additional intra prediction modes are two non-directional intra prediction modes, and
    wherein if the mode group indicator does not indicate the MPM group, the prediction mode restoring unit derives the intra prediction mode of the current block by performing the ordered steps of:
        increasing a value of the prediction mode index by one if the prediction mode index is equal to or greater than a first intra prediction mode of the MPM group;
        increasing the value of the prediction mode index by one if the prediction mode index is equal to or greater than a second intra prediction mode of the MPM group;
        increasing the value of the prediction mode index by one if the prediction mode index is equal to or greater than a third intra prediction mode of the MPM group; and
        determining the value of the prediction mode index as the mode number of the intra prediction mode of the current block.

2. The method of claim 1, wherein the first intra prediction mode is an intra prediction mode having lowest mode number, the second intra prediction mode is an intra prediction mode having middle mode number and the third intra prediction mode is an intra prediction mode having highest mode number.

3. The method of claim 1, wherein the three intra prediction modes are reordered in the order of mode number to determine the first intra prediction mode, the second intra prediction mode and the third intra prediction mode.

4. The method of claim 1, wherein when the left intra prediction mode is equal to the above intra prediction mode and the left intra prediction mode is a non-directional intra prediction mode, the MPM group includes the two non-directional intra prediction modes and a vertical mode.

5. The method of claim 1, wherein the two non-directional intra prediction modes are a DC mode and a planar mode.

6. The method of claim 1, wherein if the size of the current block is 4×4, the reference pixels are not filtered, and if the size of the current block is larger than 4×4, the number of intra prediction mode where the reference pixels are filtered increases as the size of the current block becomes larger.

7. The method of claim 1, wherein in the vertical mode, the prediction pixels of the prediction block which are adjacent to the left reference pixels are generated by using a vertical reference pixel and a variance between a corner pixel and a left neighboring pixel.

* * * * *